(12) United States Patent
Chang et al.

(10) Patent No.: US 7,555,697 B2
(45) Date of Patent: Jun. 30, 2009

(54) ERROR CORRECTION METHOD IN DIGITAL DATA STORAGE DEVICE

(76) Inventors: Wen-Jeng Chang, 4F., No. 3, Guojhong Rd., Yonghe City, Taipei County 234 (TW); Pei-Jei Hu, 8F., No. 533, Chung-Cheng Rd., Hsin-Tien City, Taipei Hsien (TW); Yu-Fu Yeh, 8F., No. 533, Chung-Cheng Rd., Hsin-Tien City, Taipei Hsien (TW)

( * ) Notice: Subject to any disclaimer, the term of this patent is extended or adjusted under 35 U.S.C. 154(b) by 333 days.

(21) Appl. No.: 11/178,205

(22) Filed: Jul. 8, 2005

(65) Prior Publication Data

US 2006/0015794 A1 Jan. 19, 2006

Related U.S. Application Data

(63) Continuation of application No. 09/794,935, filed on Feb. 27, 2001, now abandoned.

(51) Int. Cl.
*H03M 13/00* (2006.01)

(52) U.S. Cl. .................. 714/759; 714/708; 714/774

(58) Field of Classification Search ............... 714/759, 714/708, 794, 765, 770, 774, 766
See application file for complete search history.

(56) References Cited

U.S. PATENT DOCUMENTS

| | | | |
|---|---|---|---|
| 5,365,530 A | 11/1994 | Yoshida et al. | |
| 5,732,093 A * | 3/1998 | Huang | 714/765 |
| 6,112,324 A | 8/2000 | Howe et al. | |
| 6,345,377 B1 * | 2/2002 | Kroeger et al. | 714/790 |
| 6,557,126 B1 * | 4/2003 | Kelly | 714/708 |
| 6,820,229 B1 | 11/2004 | Sollish et al. | |
| 6,826,137 B1 * | 11/2004 | Lee et al. | 369/53.21 |
| 7,080,313 B2 * | 7/2006 | Akiyama et al. | 714/794 |
| 2001/0023495 A1 | 9/2001 | Chang et al. | |
| 2002/0144123 A1 | 10/2002 | Newman | |

FOREIGN PATENT DOCUMENTS

TW 164952 11/2002

* cited by examiner

*Primary Examiner*—Esaw T Abraham
*Assistant Examiner*—Fritz Alphonse
(74) *Attorney, Agent, or Firm*—Perkins Coie LLP

(57) ABSTRACT

A data error-detecting method for detecting errors before C1 decoding procedure is provided. First, a bit modulation is performed for modulating data channel bits obtained from an optical disk into 8-bit data. When the data channel bits is determined to introduce a legal mapping, an erasure bit having a first value is derived and tagged at the modulated 8-bit data, otherwise an erasure bit having a second value is derived and tagged at the modulated 8-bit data. After the 8-bit data being arranged as a codeword composed of 32 erasure bits respectively tagged with 32 8-bit data, counting the number of the modulated 8-bit data tagged with the erasure bit having the second value. When the counted number is less than 4, the codeword composed modulated 8-bits data tagged with the erasure bits having the second value can be corrected.

17 Claims, 3 Drawing Sheets

ERROR CORRECTION METHOD IN DIGITAL DATA STORAGE DEVICE

CROSS-REFERENCE TO RELATED APPLICATION

The present application is a Continuation-in-Part of U.S. patent application Ser. No. 09/794,935 entitled "ERROR CORRECTION IN DIGITAL DATA STORAGE DEVICE" filed on Feb. 27, 2001 (which has been abandoned). The prior application Ser. No. 09/794,935 claims the priority benefit of Taiwan application serial no. 89103470, filed on Feb. 29, 2000. All disclosures are incorporated herewith by reference.

BACKGROUND OF THE INVENTION

1. Field of Invention

The present invention relates to an error detecting method and apparatus, more particularly to an error detecting method and apparatus for detecting errors before C1 decoding procedure.

2. Description of Related Art

Generally, before recognizing data stored in an optical disk, the front-end circuit of the optical disk drive is employed to transform an analog RF (radio frequency) signal read from the optical disk into series of digital data channel bits. These digital data channel bits are subsequently modulated by a modulating unit. For example, an EFM unit performs an eight-to-fourteen bit modulation (EFM) for data accessed from an optical disk such as a CD-ROM, while an eight-to-sixteen bit modulation is executed for modulating data read from those DVD-type optical disks. In the following paragraphs, a CD-ROM is chosen as an example for the sake of explanations.

FIG. 1 is a schematic diagram showing an error detecting apparatus in a conventionally optical disk drive. In general, an optical disk drive includes an EFM unit 10 for modulating each data having 14 data channel bits ("14-bit data" as for short hereinafter) obtained from the front-end circuit into an 8-bit data. The EFM unit 10 refers to a look-up table 11 defining 256 relationships between 14-bit and 8-bit data mapping during the EFM modulation. Table 1 shows a portion of the EFM look-up table, which can be constructed in the optical disk drive.

TABLE 1

| EFM | Channel Bits | Data Bits |
|---|---|---|
| 0 | 01001000100000 | 00000000 |
| 1 | 10000100000000 | 00000001 |
| 2 | 10010000100000 | 00000010 |
| 3 | 10001000100000 | 00000011 |
| 4 | 01000100000000 | 00000100 |
| 5 | 00000100010000 | 00000101 |
| ... | ... | ... |
| 255 | 00100000010010 | 11111111 |

Since there are $2^8=256$ and $2^{14}=16384$ different combinations for the 8-bit and 14-bit data, respectively, the combinations of the 8-bit data is considerably lower than that of the 14-bit one. Obviously, only 256 mappings between the 14-bit and 8-bit data are authorized and existed in the EFM look-up table, and the rest combinations of the 14-bit data non-defined in the EFM look-up table are all illegal mappings. Sometimes, the modulated 8-bit data may be erroneous when the combination of the 14-bit data obtained from the front-end circuit becomes a non-defined one of the EFM look-up table. Related error detection and correction are therefore activated for error recovery purpose. At present, cross-interleave Reed-Solomon code (CIRC) is the most commonly used approach for detecting and correcting errors of data accessed from an optical disk.

Please refer to FIG. 1. Each of the 14-bit data obtained from the front-end circuit is modulated to 8-bit data in the EFM unit 10 whenever the 14-bit data is legal. A one symbol delay unit 12 in FIG. 1 receives and arranges the modulated 8-bit data subsequently and then outputs a codeword composed of 32-byte data, while a C1 decoder 14 receives the codeword and performs a C1 decoding procedure. In the conventional CIRC decoding method, this C1 decoder at most provides a capacity for decoding two errors. That is, a conventional C1 decoder is capable of detecting positions of two errors, and evaluating two correct values for these two detected errors. In other words, the C1 decoder 14 can decode only up to two errors even there are more than two errors in a codeword because the conventional C1 decoder has to share capability of detecting where the errors allocate. For the convenience of identifying a codeword might have error embedded inside, the C1 decoder 14 tags an erasure bit for each modulated 8-bit data. For example, a "0" erasure bit tagged at the modulated 8-bit data after the C1 decoding procedure represents this modulated 8-bit data as "correct," and a "1" erasure bit tagged at the modulated 8-bit data after the C1 decoding procedure represents the modulated 8-bit data "may contain an error."

After that, the C1 decoder 14 delivers 28 erasure bits attached to 28 bytes of data to an interleaving unit 16 for data interleaving. These 28 erasure bits and the 28 bytes of interleaved data are then directed to a C2 decoder 18 to continue a C2 decoding procedure. A conventional C2 decoder 18 cannot decode data having more than four errors because the conventional C2 decoder at most provides a capacity for decoding four errors. The C2 decoder 18 also tags an erasure bit for each interleaved 8-bit data. Tagging this erasure bit is for easily identifying whether the interleaved 8-bit data might be erroneous after the C2 decoding procedure. For example, a "0" erasure bit tagged at the interleaved 8-bit data after the C2 decoding procedure represents the interleaved 8-bit one is accurate, while a "1" erasure bit tagged for the interleaved 8-bit data after the C2 decoding procedure represents the interleaved 8-bit data might be erroneous. Thereafter, the C2 decoder 18 delivers 24 erasure bits attached to 24-byte data into a two symbol delay unit 20. This CIRC decoding approach mainly used in the aforementioned C1 and C2 decoders is to detect error positions and to evaluate correct values for correcting purpose.

In conclusion, there are many constraints in the conventional CIRC decoding method for the optical disk drives because there are restrictions on the error decoding capacities of the decoders, for example, the conventional C1 decoder is limited to decode two errors. Therefore, there is a need to disclose a method for overcoming the aforementioned disadvantage such that an optical disk capable of operating under high speeds for accessing large data-storage media may operate under sufficient error decoding capacity.

SUMMARY OF THE INVENTION

An error detecting method for detecting errors before a C1 decoding procedure includes the steps of performing a bit modulation for modulating data channel bits obtained from an optical disk into 8-bit data; referring to a look-up table to determine if the combination of the obtained data channel bits is defined in the look-up table, wherein the look-up table defines 256 mapping relationships between the combination of the data channel bit and 8-bit data; generating an erasure bit having a first value tagged at the modulated 8-bit data if the combination of the obtained data channel bits is defined in the look-up table, otherwise generating an erasure bit having a second value tagged at the modulated 8-bit data; arranging the modulated 8-bit data with tagged erasure bit as a codeword composed of 32 bytes of modulated 8-bit data tagged with related erasure bits; and counting the number of the modulated 8-bit data tagged with erasure bit having the second value in the arranged codeword.

In the preferred embodiment of the present invention, the method further includes the steps of correcting the codeword when the counted number is less than 4, otherwise bypassing the codeword when the counted number is larger than 4.

An error detecting apparatus is disclosed for detecting error before a C1 decoding procedure, which includes a bit modulation unit for modulating data channel bits obtained from an optical disk into 8-bit data, and for tagging an erasure bit at the modulated 8-bit data; a one symbol delay unit for receiving the modulated 8-bit data subsequently, and for arranging the 8-bit data tagged with erasure bit as a codeword composed of 32 bytes of the modulated 8-bit data tagged with related erasure bits; and a C1 decoder for receiving the arranged codeword, and for performing the C1 decoding procedure.

In the preferred embodiment of the present invention, the apparatus further includes a determining unit for receiving the data channel bits and for determining whether the combination of data channel bits is defined in a look-up table, wherein the look-up table defines 256 mapping relationships between the combination of the data channel bits and 8-bit data; and an erasure bit generator coupled to the determining unit for generating an erasure bit tagged with the modulated 8-bit data to identify whether the combination of the data channel bits is defined in the look-up table.

In the preferred embodiment of the present invention, the erasure bit generator generates an erasure bit having a first value tagged with the modulated 8-bit data when the determining unit determines the combination of the data channel bits is defined in the look-up table, otherwise the erasure bit generator derives an erasure bit having a second value tagged with the modulated 8-bit data.

In the preferred embodiment of the present invention, the C1 decoder includes a counting unit for counting the number of the modulated 8-bit data being tagged with an erasure bit having the second value in the arranged codeword, wherein the C1 decoder performs the C1 decoding procedure when the counted number is less than 4, otherwise bypasses the arranged codeword.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
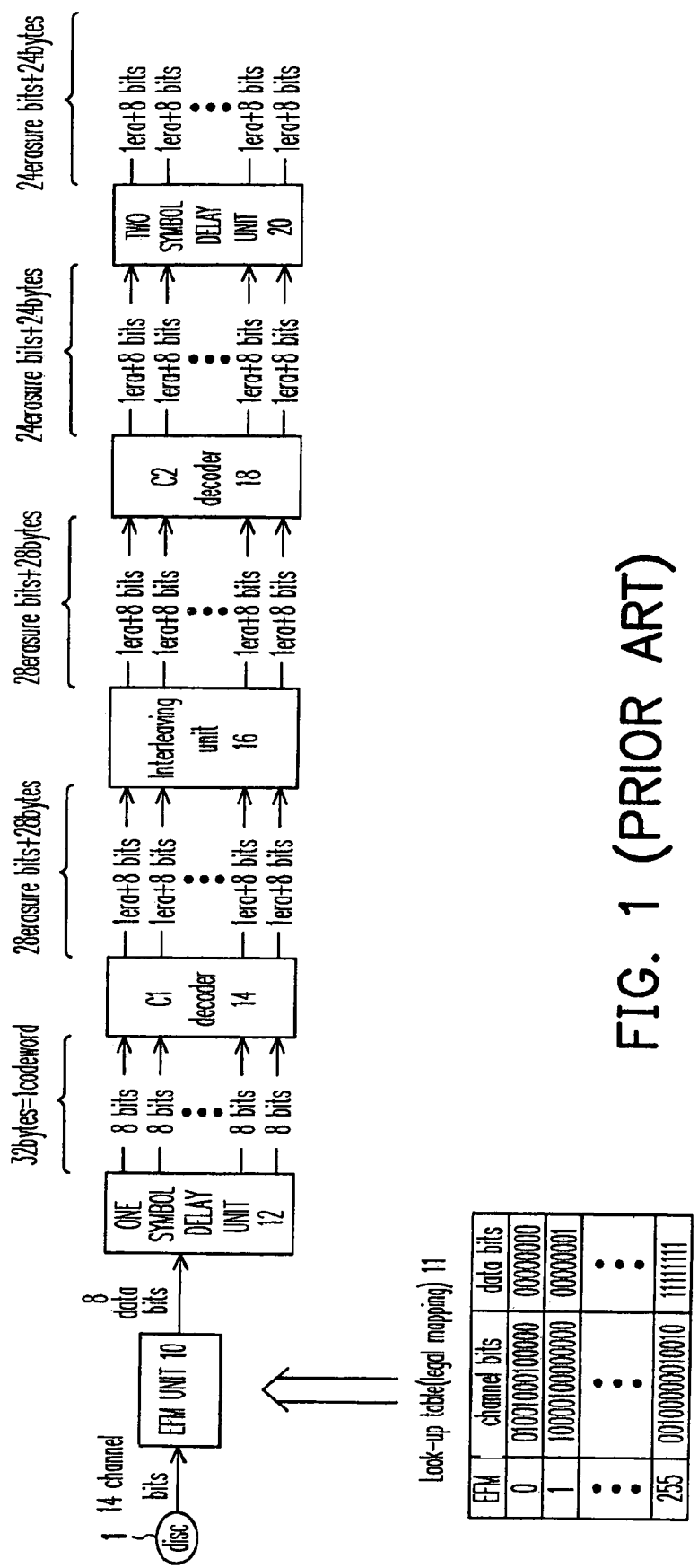
FIG. 1 is a schematic diagram showing an error detecting apparatus in a conventional optical disk drive.

Reference will now be made in detail to the present preferred embodiments of the invention, examples of which are illustrated in the accompanying drawings. Wherever possible, the same reference numbers are used in the drawings and the description to refer to the same or like parts.

Figure 2:
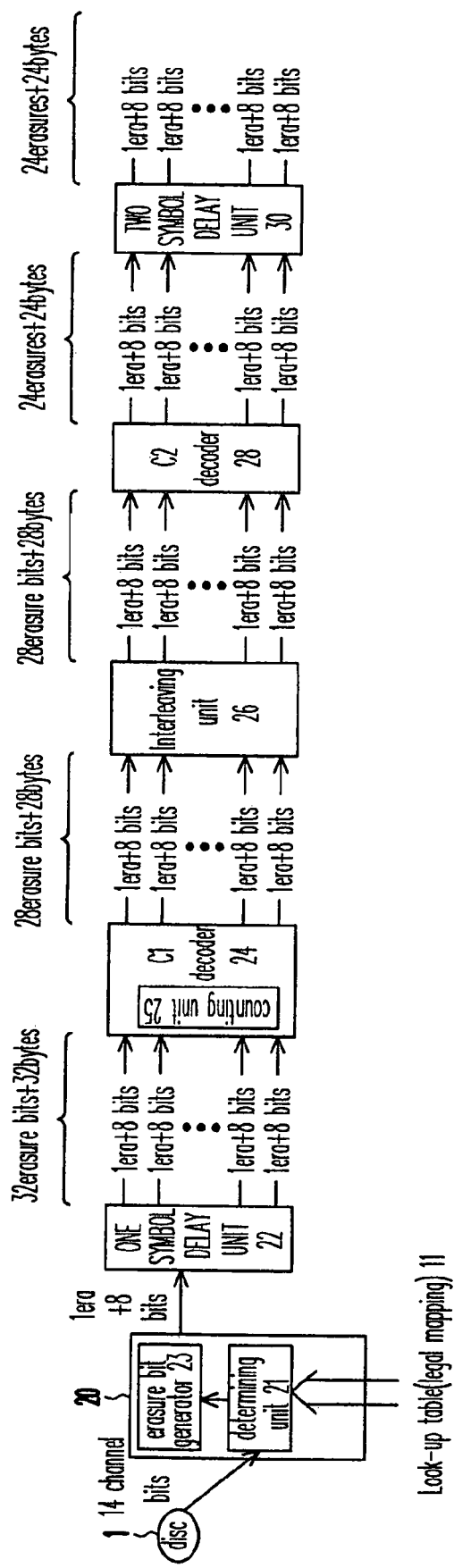
FIG. 2 is a schematic diagram according to the error detecting apparatus of this invention.

Please now refer to FIG. 2. A schematic diagram according to the error detecting apparatus of this invention encompasses an EFM unit 20, a one symbol delay unit 22, a C1 decoder 24, an interleaving unit 26, a C2 decoder 28, and a two symbol delay unit 30. Each of the 14-bit data obtained from the front-end circuit of an optical disk drive in the embodiment is modulated into 8-bit data by the EFM unit 20 whether each of the 14 data channel bits is a legal mapping or not. The EFM unit 20 further includes a determining unit 21 and an erasure bit generator 23. The determining unit 21 receives the 14-bit data and determines whether the received combination of this 14-bit data is a legal mapping by referring to an EFM look-up table 11, which defines 256 mapping relationships between 14-bit and 8-bit data for the EFM modulation. The erasure bit generator 23 coupled to the determining unit 21 is used for generating and tagging an erasure bit at the modulated 8-bit data to identify the modulated data is legal or illegal. When the determining unit 21 determines the received combination of the 14-bit data will introduce a legal mapping by referring to the EFM look-up table 11, the erasure bit generator 23 derives an erasure bit having a first value tagged at the front of the modulated 8-bit data before performing the C1 decoding procedure. Otherwise the erasure bit generator 23 generates an erasure bit having a second value tagged with the modulated 8-bit data before the C1 decoding procedure. The determining unit 21 and the erasure bit generator 23 in the embodiment can be implemented by logic circuits or the like according to the functions aforementioned.

For example, when the determining unit 21 determines the combination of the received 14-bit data will introduce a legal mapping by referring to the EFM look-up table 11, the erasure bit generator 23 generates an "0" erasure bit tagged at the modulated 8-bit data before the C1 decoding procedure, otherwise the erasure bit generator 23 generates an "1" erasure bit tagged at the modulated 8-bit data.

The EFM look-up table 11 in the embodiment defines 256 mapping relationships between 14-bit and 8-bit data mapping for the EFM modulation. However, in a DVD-type optical system, an eight-to-sixteen modulation is executed, and the modulating look-up table thereof defines $2^8=256$ mapping relationships between 16-bit and 8-bit data during the EFM modulation. The look-up table can be defined as Table 1 mentioned above, or as a specified table defined by associated specifications of the optical disks. In addition, the look-up table can be constructed inside a read-only-memory (ROM) or the like. Any ordinary person having skills in the art may modify the embodiments as his/her requirements or applications, but any modification within the spirit of the embodiment should be included in the appended claims of the invention.

The one symbol delay unit 22 in FIG. 2 receives the modulated 8-bit data tagged with related erasure bit subsequently and then arranges them as a codeword consisting of 32 erasure bits tagged at the front of associated 32-byte data before delivering to the C1 decoder 24. The modulated 8-bit data tagged with an erasure bit having the first value represents the 14-bit data received by the EFM unit 20 could raise a legal mapping; however, the modulated 8-bit data tagged with an erasure bit having the second value may be an erroneous one. Please note that the error positions are already known before processing the C1 decoding procedure because the EFM unit 20 outputs erasure bits clearly indicating whether an 8-bit data is accurate or inaccurate. In the conventional CIRC decoding method, a C1 decoder at most provides the capacity for decoding two errors; that is, it can only detect two error positions and then evaluate two correct values for these two errors. In this embodiment, the conventional step of detecting two error positions can be replaced by evaluating the other two correct values for correcting two more errors because the C1 decoder 24 has recognized all erroneous 8-bit data by referring their erasure bits. Accordingly, the error-correcting capacity of the C1 decoder 24 in the embodiment increases from two to four.

The C1 decoder 24 includes a counting unit 25, which receives the codeword composed of 32 erasure bits tagged with related 32 bytes of data, and then counts the number of the modulated 8-bit data with an erasure bit having the second value. If the counted number is less than 4, the C1 decoder 24 has sufficient error-correcting capacity for correcting the arranged codeword. If the counted number is more then 4, the C1 decoder 24 bypasses the codeword to next stage circuit. Please note that the counting unit 25 in the embodiment can be implemented by logic circuits or the like.

The circuits after the C1 decoder 24 are the same with the conventional optical disk drive shown in the FIG. 1. After that, the C1 decoder 24 outputs 28 bytes of data tagged with related 28 erasure bits at their front end into an interleaving unit 26 for the sake of data interleaving. Please note that the C1 decoder 24 eliminates 4 parity bytes from the arranged codeword so as to derive the 28-byte data tagged with related 28 erasure bits before bypassing the arranged one to next stage circuit. The interleaving unit 26 manipulates the 28 erasure bits and the 28 bytes as interleaved data and then outputs to a C2 decoder 28 to continue a C2 decoding procedure. In the conventional CIRC decoding method, a C2 decoder at most provides the capacity for decoding four errors, which indicates that the C2 decoder 28 can decode only up to four errors when there are more than four errors. Next, the C2 decoder 28 tags an erasure bit at front end of each interleaved 8-bit data. Tagging an erasure bit is for easily identifying the interleaved 8-bit data that may still have an error after the C2 decoding procedure. After that, the C2 decoder 28 outputs 24 erasure bits and 24 bytes of data to the two symbol delay unit 30. The C2 decoder 28 of the embodiment may be the same as the C2 decoder 18 conventionally used, and therefore no additional load is raised for designers.

By following the error detection schematic diagram shown in the FIG. 2, the error-correcting capacity of the C1 decoder 24 is upgraded from two to four. A high error-correcting capacity is beneficial to the read rate of high-speed optical disk. For example, the disclosed C1 decoder 24 of the embodiment may correct more errors than before, which significantly degrades the load of next stage circuits used because the next stage circuit may decode associated received data without detecting errors.

Figure 3:
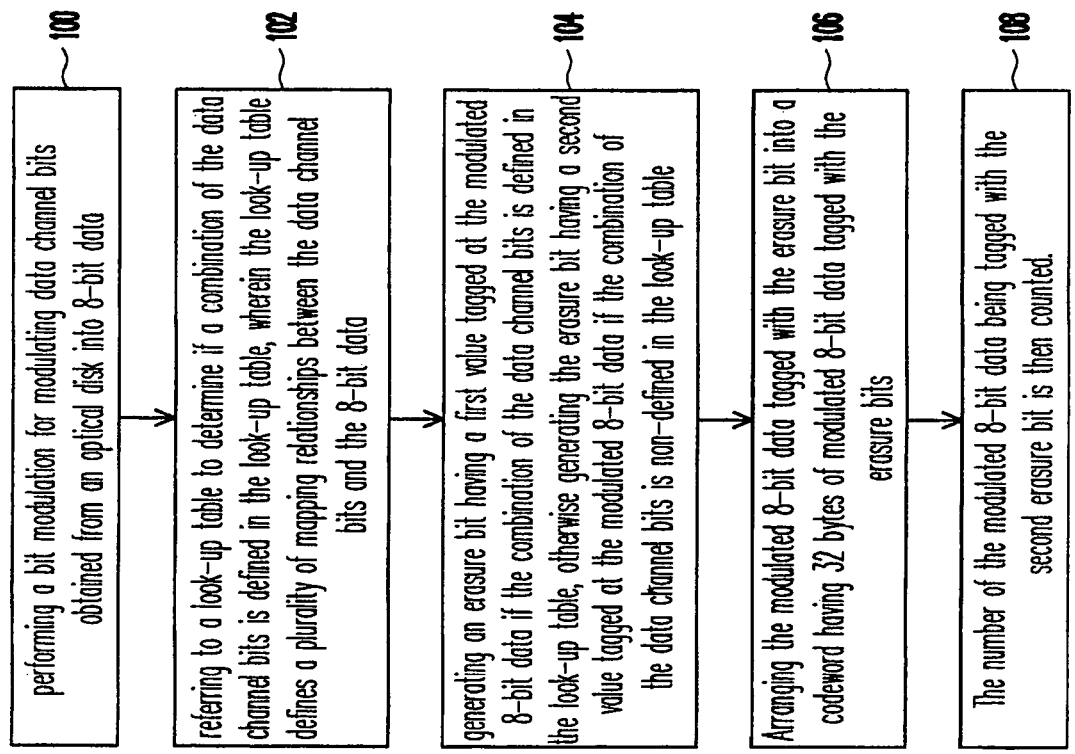
FIG. 3 is a flow diagram according to the error detecting method of this invention.

FIG. 3 is a flow diagram according to the error detecting method of this invention. First, a bit modulation is performed for modulating data channel bits obtained from an optical disk into 8-bit data (step 100). Next, a look-up table is referred to determine if the combination of the obtained data channel bits is defined in the look-up table, wherein the look-up table defines 256 mapping relationships between the data channel bits and 8-bit data (step 102). If the obtained data channel bits is defined in the look-up table, an erasure bit having a first value is generated and tagged at the modulated 8-bit data, otherwise an erasure bit having a second value is generated and tagged with the modulated 8-bit data (step 104). Thereafter, those 8-bit data are arranged into a codeword composed of 32 bytes of modulated 8-bit data tagged with related erasure bits (step 106). The number of the modulated 8-bit data being tagged with an erasure bit having the second value is then counted (step 108). If the counted number is less than 4, then the arranged codeword is recovered to correct values in the disclosed C1 decoder. If the counted number is more than 4, the codeword is bypassed to the C2 decoder for further manipulations. Please note that more error correct efficiency can be obtained based on the embodiment because the C1 decode 24 has capability of correcting four errors in a codeword. Moreover, the original design in the C1 decoder 14 for detecting allocations of the errors may be remained at the C1 decoder 24 and enabled/disabled according to designers' selection, wherein a Boolean-type flag may be employed for showing this enabled/disabled status. For example, a designer may enable the disclosed function that attaches erasure bits for each 8-bit data in the EFM unit 20, while the original design in the C1 decoder 14 for detecting allocations of the errors will be disabled simultaneously. Conversely, the error-correcting capability of the C1 decoder 24 may be degraded from two to four when the disclosed function of the C1 decoder 24 is disabled, which indicates that the C2 decoder 24 operates as the conventional C1 decoder 14 now. An ordinary person having skills in the art may modify the embodiment as his/her requirements, but any modification within the spirits of the embodiment should be included in the appended claims of the invention.

In the above description, the number of parity bits in each of the C1 and C2decoders is taken as four. Additionally, the disclosed method may be applies in any C1 and C2 decoders having various parity numbers, e.g. eight parities C1 and C2decoders. In summary, the error-detecting method and apparatus of this invention are able to detect errors before C1 decoding procedure. In addition, the error-detecting method and apparatus of this invention are able to increase the error-correcting capacity of C1 decoding procedure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data error-detecting method for detecting an error before a C1 decoding procedure so as to upgrade an error-correcting capability of a C1 decoder, comprising:

performing a bit modulation for modulating data channel bits obtained from an optical disk into 8-bit data;

referring to a look-up table to determine if a combination of the data channel bits is defined in the look-up table, wherein the look-up table defines a plurality of mapping relationships between the data channel bits and the 8-bit data;

generating an erasure bit having a first value tagged with the modulated 8-bit data if the combination of the data channel bits is defined in the look-up table;

generating the erasure bit having a second value tagged with the modulated 8-bit data if the combination of the data channel bits is not defined in the look-up table; and arranging the modulated 8-bit data tagged with the erasure bit into a codeword having 32 bytes of modulated 8-bit data tagged with the erasure bits;

at the C1 decoder, counting the number of the modulated 8-bit data having the erasure bit having the second value to determine whether the C1 decoder can detect errors of the arranged codeword.

2. The method of claim 1 further comprising:

correcting the modulated 8-bit data tagged with the erasure bit having the second value when the counted number is less than 4; and bypassing the modulated 8-bit data tagged with the erasure bit having the second value when the counted number is larger than 4.

3. The method of claim 1 wherein performing the bit modulation includes performing an eight-to-fourteen bit modulation (EFM) and the data channel bits is a 14-bit data.

4. The method of claim 1 wherein performing the bit modulation includes performing an eight-to-sixteen bit modulation and the data channel bits is a 16-bit data.

5. The method of claim 1 further comprising detecting by the C1 decoder error allocations inside the codeword according to an indication of a flag and disabling the data error-detecting method for detecting error before the C1 decoding procedure according to the indication of the flag.

6. An apparatus for detecting error before a C1 decoding procedure so as to upgrade an error-correcting capability of a C1 decoder, comprising:

a bit modulation unit that modulates data channel bits obtained from an optical disk into 8-bit data, wherein an erasure bit is tagged at the modulated 8-bit data and the erasure bit has a first value or a second value, the bit modulation unit comprising:

a determining unit that receives the data channel bits and determines whether a combination of the data channel bits is defined in a look-up table, wherein the look-up table defines a plurality of mapping relationships between the data channel bits and the 8-bit data; and an erasure bit generator coupled to the determining unit that generates the erasure bit tagged with the modulated 8-bit data to identify whether the combination of the data channel bits is defined in the look-up table; and a one symbol delay unit that receives and arranges the modulated 8-bit data into a codeword having 32 bytes of modulated 8-bit data tagged with the erasure bits;

wherein a C1 decoder receives the codeword to perform the C1 decoding procedure according to a counted number of the modulated 8-bit data with the tagged erasure bit having the second value.

7. The apparatus of claim 6 wherein the erasure bit generator generates the erasure bit having the first value tagged with the modulated 8-bit data when the determining unit determines the combination of the data channel bits is defined in the look-up table, and the erasure bit having the second value tagged with the modulated 8-bit data when the determining unit determines the combination of the data channel bits is not defined in the look-up table.

8. The apparatus of claim 6 wherein the C1 decoder performs the C1 decoding procedure when the counted number is less than 4, and the C1 decoder bypasses the modulated 8-bit data tagged with the erasure bit having the second value when the counted number is larger than 4.

9. The apparatus of claim 6 wherein the bit modulation unit performs an eight-to-fourteen bit modulation (EFM) and the data channel bits are 14-bit data.

10. The apparatus of claim 6, wherein the bit modulation unit performs an eight-to-sixteen bit modulation and the data channel bits are 16-bit data.

11. The apparatus of claim 6 wherein C1 decoder comprises a capability of detecting error allocations inside the codeword according to an indication of a flag such that the data error-detecting method for detecting error before C1 decoding procedure is disabled when the capability of detecting error allocations inside the codeword of the C1 decoder is enabled according to the indication of the flag.

12. An apparatus for detecting errors before invoking a decoding procedure performed by a decoder so as to upgrade an error-correcting capability of the decoder, comprising:

means for modulating data channel bits obtained from an optical disk into modulated data;

means for referring to a look-up table to determine if a combination of the data channel bits is defined in the look-up table, wherein the look-up table defines a plurality of mapping relationships between the data channel bits and the modulated data;

means for generating, before invoking the decoding procedure, an erasure bit set to a first value tagged with the modulated data if the combination of the data channel bits is defined in the look-up table;

means for generating, before invoking the decoding procedure, the erasure bit set to a second value tagged with the modulated data if the combination of the data channel bits is non-defined in the look-up table;

means for arranging the modulated data tagged with the erasure bit into a codeword having the modulated data tagged and the erasure bits; and means for counting the number of the modulated data set to the erasure bit having the second value to determine whether the decoder can detect errors of the arranged codeword.

13. The apparatus of claim 12 further comprising:

means for correcting the modulated data tagged with the erasure bit set to the second value when the counted number is less than an indicated value; and means for bypassing the modulated data tagged with the erasure bit set to the second value when the counted number is more than or equal to the indicated value.

14. The apparatus of claim 13 wherein the indicated value is 4.

15. The apparatus of claim 12 wherein the bit modulation is performed as an eight-to-fourteen bit modulation (EFM) and the data channel bits includes 14-bit data.

16. The apparatus of claim 12 wherein the bit modulation is performed as an eight-to-sixteen bit modulation and the data channel bits includes 16-bit data.

17. The apparatus of claim 12 wherein a decoder that implements the decoding procedure includes means for detecting error allocations inside the codeword according to an indication of a flag such that the data error-detecting method for detecting error before decoding procedure is disabled when the capability of detecting error allocations inside the codeword of the decoder is enabled according to the indication of the flag.

* * * * *

UNITED STATES PATENT AND TRADEMARK OFFICE
CERTIFICATE OF CORRECTION

PATENT NO. : 7,555,697 B2
APPLICATION NO. : 11/178205
DATED : June 30, 2009
INVENTOR(S) : Wen-Jeng Chang et al.

It is certified that error appears in the above-identified patent and that said Letters Patent is hereby corrected as shown below:

In column 1, line 37, delete "conventionally" and insert -- conventional --, therefor.

In column 6, line 34, delete "C2decoders" and insert -- C2 decoders --, therefor.

In column 6, line 37, delete "C2decoders." and insert -- C2 decoders. --, therefor.

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,555,697 B2 | Page 1 of 1 |
| APPLICATION NO. | : 11/178205 | |
| DATED | : June 30, 2009 | |
| INVENTOR(S) | : Chang et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 333 days.

Delete the phrase "by 333 days" and insert -- by 689 days --

Signed and Sealed this

Eighth Day of June, 2010

David J. Kappos
*Director of the United States Patent and Trademark Office*